United States Patent
Costa et al.

(10) Patent No.: US 10,228,745 B2
(45) Date of Patent: *Mar. 12, 2019

(54) RESUMING A SYSTEM-ON-A-CHIP DEVICE

(71) Applicant: HEWLETT-PACKARD DEVELOPMENT COMPANY, L.P., Houston, TX (US)

(72) Inventors: Carlos Haas Costa, Palo Alto, CA (US); Taciano Dreckmann Perez, Porto Alegre (BR); Christian Samuel Perone, Porto Alegre (BR); Thiago Silva, Porto Alegre (BR); Craig A Walrath, Houston, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/519,857

(22) PCT Filed: Jan. 29, 2015

(86) PCT No.: PCT/US2015/013468
§ 371 (c)(1),
(2) Date: Apr. 18, 2017

(87) PCT Pub. No.: WO2016/122520
PCT Pub. Date: Aug. 4, 2016

(65) Prior Publication Data
US 2017/0249002 A1    Aug. 31, 2017

(51) Int. Cl.
*G06F 1/26*     (2006.01)
*G06F 1/32*     (2006.01)
(Continued)

(52) U.S. Cl.
CPC ............ *G06F 1/3206* (2013.01); *G06F 1/325* (2013.01); *G06F 1/3243* (2013.01);
(Continued)

(58) Field of Classification Search
None
See application file for complete search history.

(56) References Cited

U.S. PATENT DOCUMENTS 6,564,286 B2   5/2003   DaCosta
7,152,138 B2   12/2006  Spencer et al.
(Continued)

FOREIGN PATENT DOCUMENTS

EP    1313028       5/2003
EP    1313028 A2    5/2003
(Continued)

OTHER PUBLICATIONS

Inwhee et al:"Bootup time improvement for embedded . . . " Next Gen Info Tech, Jun. 2011 The 2nd Int'l Conf, IEEE pp. 193-196.
(Continued)

*Primary Examiner* — Nitin C Patel
(74) *Attorney, Agent, or Firm* — Trop, Pruner & Hu

(57) ABSTRACT

As part of starting a system including a system-on-a-chip (SoC) device from a mode in which power is removed from the system, the SoC device determines, based on the metadata, whether to resume the system to a prior system state. In response to the metadata indicating that the system is to be resumed to the prior system state, the system is resumed to the prior system state using system state information stored in the on-chip non-volatile memory.

20 Claims, 4 Drawing Sheets

(51) Int. Cl.
*G06F 1/3206* (2019.01)
*G06F 9/4401* (2018.01)
*G06F 1/3234* (2019.01)
*G06F 1/3246* (2019.01)
*G06F 13/42* (2006.01)
*H04L 12/933* (2013.01)
*G06F 11/14* (2006.01)
*G06F 21/57* (2013.01)
*G06F 9/455* (2018.01)

(52) U.S. Cl.
CPC ........ *G06F 1/3246* (2013.01); *G06F 9/4403* (2013.01); *G06F 9/4418* (2013.01); *G06F 11/1417* (2013.01); *G06F 11/1438* (2013.01); *G06F 13/42* (2013.01); *G06F 21/575* (2013.01); *H04L 49/15* (2013.01); *G06F 2009/45575* (2013.01)

(56) References Cited

U.S. PATENT DOCUMENTS

| | | | |
|---|---|---|---|
| 7,293,183 | B2 | 11/2007 | Lee et al. |
| 7,550,994 | B1 | 6/2009 | Camarota et al. |
| 8,205,070 | B2 | 6/2012 | Toelkes |
| 8,433,886 | B2 | 4/2013 | Lee |
| 8,443,211 | B2 | 5/2013 | Zhao et al. |
| 8,522,004 | B2 | 8/2013 | Borras |
| 8,539,216 | B1 | 9/2013 | Feng et al. |
| 2002/0129191 | A1 | 9/2002 | Dacosta |
| 2003/0097510 | A1* | 5/2003 | Joseph ............ G06F 15/7842 710/305 |
| 2004/0044917 | A1 | 3/2004 | Lee et al. |
| 2005/0268086 | A1 | 12/2005 | Kim |
| 2006/0242398 | A1 | 10/2006 | Fontijn et al. |
| 2008/0294838 | A1 | 11/2008 | Houston et al. |
| 2011/0231595 | A1 | 9/2011 | Wakrat et al. |
| 2012/0151125 | A1 | 6/2012 | Yang |
| 2013/0042057 | A1 | 2/2013 | Sinclair et al. |
| 2013/0159602 | A1 | 6/2013 | Adams et al. |
| 2014/0164725 | A1 | 6/2014 | Jang et al. |
| 2014/0164753 | A1 | 6/2014 | Lee |
| 2014/0181495 | A1 | 6/2014 | Jang et al. |
| 2014/0245294 | A1 | 8/2014 | Kaul |
| 2014/0281464 | A1 | 9/2014 | Le et al. |

FOREIGN PATENT DOCUMENTS

| | | |
|---|---|---|
| WO | WO-2004107168 | 12/2004 |
| WO | WO-2007050176 A2 | 5/2007 |
| WO | WO-2015167455 A1 | 11/2015 |

OTHER PUBLICATIONS

"ARM® Cortex™—M1 Embedded Processor Software Development Tutorial for Fusion Mixed-Signal FPGAs"; Nov. 2009; 44 pages.

Condit et al., < http://www.eecs.harvard.edu/cs261/notes/condit-2009.html > Better I/O Through Byte-addressable, Persistent Memory, 2009 (3 pages).

Costa et al., Int. Appl. No. PCT/US2015/013466 entitled Booting a Syste-on-a-Chip Device filed Jan. 29, 2015 (25 pages).

Hewlett-Packard Development Company, L.P., International Appl. No. PCT/US2014/012433 filed Jan. 22, 2014 (37 pages).

Moraru et al., < http://www.pdl.cmu.edu/PDL-FTP/NVM/CMU-PDL-11-114V2.pdf > Persistent, Protected and Cached: Building Blocks for Main Memory Data Stores, Nov. 2012 (28 pages).

Ng, C.; "On-chip Nonvolatile Memory Proves Ideal for Consumer Applications"; May 23, 2005; 10 pages.

Perez, International Application No. PCT/US14/35836, Entitled "Resuming a System Using State Information", filed Apr. 29, 2014, 25 pages.

* cited by examiner

RESUMING A SYSTEM-ON-A-CHIP DEVICE

BACKGROUND

An electronic device can include a volatile main memory, a non-volatile memory, and secondary storage. The volatile main memory of an electronic device can be implemented with one or multiple volatile memory devices. A volatile memory device loses its data if power is removed from the memory device. The non-volatile memory and the secondary storage can be implemented using one or multiple non-volatile (or persistent) memory or storage devices. A non-volatile memory or storage device retains its stored content even if power is removed from the non-volatile memory or storage device.

BRIEF DESCRIPTION OF THE DRAWINGS

Some implementations are described with respect to the following figures.

DETAILED DESCRIPTION

Figure 1B:
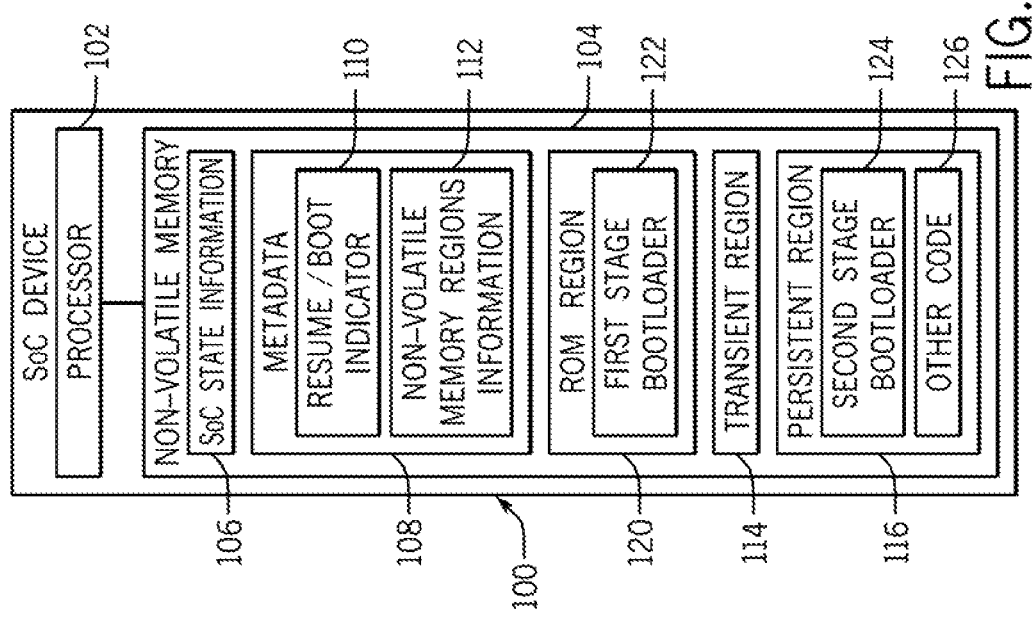
FIGS. 1A and 1B are block diagrams of example system-on-a-chip (SoC) devices, according to various implementations.

As integrated circuit technology has advanced, the number of features that can be incorporated onto an integrated circuit chip has increased. An integrated circuit chip on which a processor, an on-chip memory, and other components are provided can be referred to as a system-on-a-chip (SoC) device. A SoC device can refer generally to any chip including an integrated circuit die or an arrangement of dies that is (are) encapsulated within a package, and on which at least a processor and an on-chip memory are provided. An "on-chip" memory can refer to a memory device(s) that is (are) mounted in the same chip as the processor and possibly other components.

In some examples, to start a system that includes a SoC device (with an on-chip volatile main memory), a boot code, an operating system, and/or a prior state of the system is loaded (copied) from a storage (a secondary storage or a non-volatile memory) that is off (external of) the SoC device, into the on-chip volatile main memory. The copying of the boot code, the operating system, and/or the prior state to the on-chip volatile main memory can take a relatively long period of time, which can lengthen the time involved in starting the system. Starting a system can include booting the system, which includes starting the operating system to begin from an initial state. Alternatively, starting a system can include resuming the system from a prior state that is saved in state information.

In accordance with some implementations according to the present disclosure, a SoC device is provided with an on-chip non-volatile memory that stores information to allow the SoC device, or more generally, a system including the SoC device, to use the stored information in the on-chip non-volatile memory to resume a system including the SoC device to a prior system state. Resuming the system can refer to resuming just the SoC device, or resuming the SoC device and other components of the system, including hardware devices and/or machine-executable instructions.

A system can be resumed from a mode in which power has been removed from the system. Power being removed from the system can refer to power being removed from just a part of the system, or an entirety of the system. Some examples of modes in which power is removed from the system include a sleep state or a hibernation state. When the system enters into a sleep state or hibernation state, system state information that represents a current state of the system is saved to the on-chip non-volatile memory. The system state information can include information relating to a current execution state of machine-executable instructions (e.g. an operating system, bare-metal code, application code, etc.) that were executing on the SoC device (or system including the SoC device) prior to entering the sleep state or hibernation state. Bare-metal code refers to code that can run on a platform without the presence of an operating system. The system state information can also include current data processed by the machine-executable instructions. The system state information can also include information relating to states of hardware devices.

In other implementations, a system can be resumed to other types of states, such as a clean boot state, a last known good state, a state corresponding to a restore point, and so forth. Resuming the system to these other types of states can be performed without having to remove power from the system. For example, the system can be restarted, without removing power, to any of the foregoing other types of states.

A clean boot state can refer to a state of a system at the end of a boot procedure that completed successfully (referred to as a "clean boot"). A last known good state refers to a state of a system that is known to be free of errors, faults, and/or malware. The clean boot state or last known good state can be saved by taking a snapshot of the system, for example. A restore point can refer to a state of a system at a given point in time that has been designated by a user or other entity as a state to which the system can be restored. Information relating to any of the foregoing states can also be stored in the on-chip non-volatile memory.

To resume the system from the mode in which power has been removed from the system, system state information can be read from the on-chip non-volatile memory. In addition, the on-chip non-volatile memory can store boot instructions that are executed by the SoC device to perform the resuming of the SoC device. The boot instructions can be executed in place (XIP) from the on-chip non-volatile memory, which refers to executing the boot instructions from the on-chip non-volatile memory without first copying the boot instructions to volatile main memory. In other examples, the boot instructions can be copied to another memory (volatile or non-volatile memory), which may also be on chip. Such other memory can include a static random access memory (SRAM), a cache, a main memory, or another memory. As an example, a memory (e.g. SRAM, etc.) on the SoC device can be used to execute code from the memory before the memory is used as a cache.

The on-chip non-volatile memory can also store metadata that can include various parameters that relate to the on-chip non-volatile memory as well as the SoC device. In some implementations, the metadata can include a parameter for indicating whether or not a system including the SoC device is to be resumed to a prior system state or booted in response to a start of the system. For example, the parameter can be set to a first value to indicate that the system is to be resumed, and can be set to a second value to indicate that the system is to be booted. Other metadata is discussed further below.

Figure 1A:
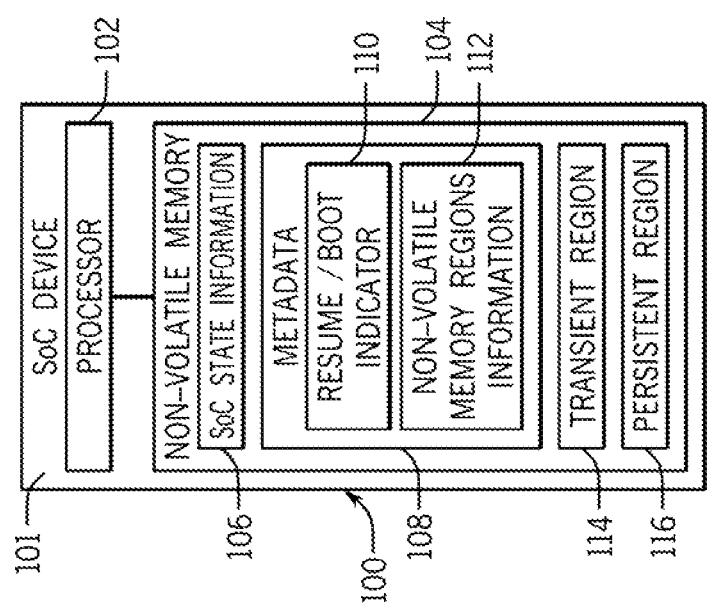

FIG. 1A is a block diagram of an example SoC device 100 according to some implementations. The SoC device 100 includes a processor 102 and a non-volatile memory 104. Although just one processor 102 is depicted, it is noted that the SoC device can include multiple processors. In some examples, the processor 102 can be a processor core. There can be multiple processor cores in the SoC device 100.

The processor 102 and the non-volatile memory 104 can be formed on a common integrated circuit die 101 of the SoC device 100. Alternatively, the processor 102 and the non-volatile memory 104 can be provided on multiple integrated circuit dies that are completely encapsulated within a common package. The package also supports contacts (e.g. electrical contacts, optical connection elements, etc.) of the SoC device 100.

The non-volatile memory 104 can be implemented with any of various of different types of non-volatile memory technologies. As examples, the non-volatile memory 104 can include any one or some combination of the following: flash memory, resistive random access memory (RRAM), memristor memory, phase-change random access memory (PCM, PCRAM, or PRAM), magnetoresistive random access memory (MRAM), spin-transfer torque random access memory (STT-RAM), backup-power-backed (e.g. battery-backed) dynamic random access memory (DRAM), and so forth.

In some implementations, the non-volatile memory 104 can be a byte-addressable memory. A byte-addressable memory is a memory in which individual bytes of data can be read and written. In other words, an individual byte of data can be read from or written to the byte-addressable memory without reading/writing other parts of memory. A byte-addressable memory is distinguishable from a memory where a read operation or a write operation has to be performed on a block of data, where the block of data is larger than a byte.

Figure 3A:
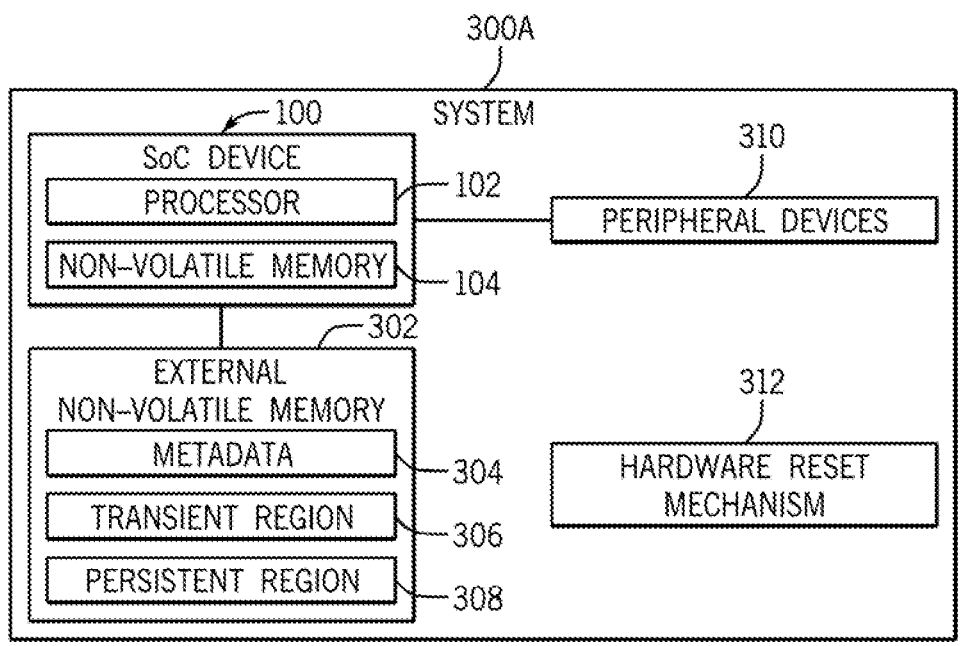
FIGS. 3A and 3B are block diagrams of example systems including a SoC device according to some implementations.
Figure 3B:
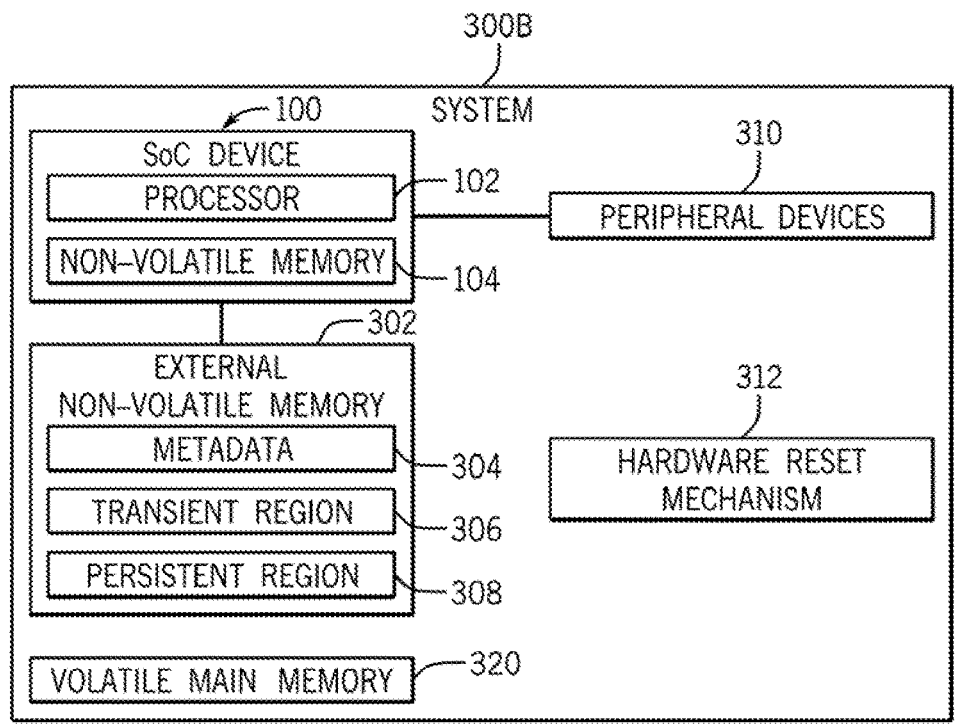

The non-volatile memory 104 can store various information, including SoC state information 106 and metadata 108. The non-volatile memory 104 can also include multiple logical regions, such as a transient region 114 and a persistent region 116. The SoC state information 106 and certain information in the transient region 114 make up the system state information regarding a prior system state of a system that includes the SoC device 100. Examples of systems are depicted in FIGS. 3A and 3B. A prior system state of a system can refer to a state at a time when one or multiple programs are executing. The SoC state information 106, data in the transient region 114, and data in the persistent region 116 of the non-volatile memory 104 are retained even if power is removed from the non-volatile memory 104. Note that if a system boots without considering a prior system state, the SoC state information 106 and the data in the transient region 114 are ignored and can be discarded, such as by being overwritten or deleted. On the other hand, if the system resumes to a prior system state, then the SoC state information 106 and the data in the transient region 114 are reused.

The system state information in the non-volatile memory 104 can be used to resume the system to a prior system state, in response to which the system begins execution starting from the prior system state. Resuming to a prior system state using the system state information stored in the non-volatile memory 104 can be faster than booting the system to place the system in an initial state.

The SoC state information 106 can include data copied from registers of the processor 102 and a cache (which can be part of the processor 102 or outside of the processor 102). The registers and cache are volatile storage, such that the data in the registers and cache are volatile data that would be lost if power is removed from the SoC device 100. Examples of registers can include a current value of a program counter, information relating to a configuration of the system, data produced by arithmetic operations, and so forth. The cache can store machine-executable instructions of programs and also data, where the instructions and data can be copies stored into the cache from another storage, such as the transient region 114, persistent region 116, or another storage.

By copying the SoC state information 106 to the non-volatile memory 104, the SoC state information 106 can become persistent and can be reused when resuming the SoC device 100.

The transient region 114 can store other data, such as data that is normally loaded into a volatile main memory. Examples of data in the transient region 114 include machine-executable instructions of programs, temporary data used by drivers, an operating system, and program processes, temporary file data, information regarding a current state of the operating system, a current state of baremetal code, a current state of certain application programs, a current state of certain hardware devices, and so forth.

As an example, prior to a system including the SoC device 100 transitioning to a lower power mode, a document being processed by an application program may be open. The data in the transient region 114 associated with the application program can indicate the open document and can include the current content of the document, such that when the system is resumed to a prior system state (by using the system state information including the SoC state information 106 and certain data in the transient region 114) from the lower power mode, the document remains open with the content that existed when the system was placed into the lower power mode.

The metadata 108 can include an indicator 110 for indicating whether a system including the SoC device 100 is to be resumed or booted. The indicator 110 can be in the form of a flag that is settable to one of multiple different values. If the indicator 110 is set to a first value, then that indicates that the system is to be resumed when the system is started from a mode in which power has been removed from the system. If the indicator 110 is set to a second, different value, then that indicates that the system is to be booted when the system is started from a mode in which power has been removed from the system. In other examples, the metadata 108 can also include other indicators to indicate resuming of the system to specific states, such as a clean boot state, a last known good state, a state corresponding to a restore point, and so forth.

In addition, the metadata 108 can include non-volatile memory regions information 112 that relate to multiple different logical regions of the non-volatile memory 104. In the example of FIG. 1A, the multiple logical regions of the non-volatile memory 104 can include the transient region 114 and the persistent region 116. The non-volatile memory 104 can also include another region, discussed further below. A "logical region" of a memory can refer to a defined segment of the memory, where the segment can include contiguous memory locations or non-contiguous memory locations. The non-volatile memory regions information 112 can be used to locate or identify the multiple logical regions in the non-volatile memory 104. Locating or identifying the multiple logical regions can refer to making a determination of a starting address of each logical region and other attribute(s) of each logical region.

The persistent region 116 contains data or other information that is to be maintained even if power is removed from a system including the SoC device 100. Thus, in response to a power cycle of the system (when power is removed from the system and subsequently applied again to the system) that results in the system being booted (rather then resumed), information contained in the transient region 114 is ignored and/or discarded, while information in the persistent region 116 is maintained. Examples of information in the transient region 114 that should be discarded during a boot include data created by the operating system, bare-metal code, and user processes that are not meant to be persistent. Examples of such data include page table entries (PTE) created if paging is enabled, general program data, and/or data that is volatile or sensitive such as secret keys or user credentials. Note, however, that when the system is resumed to a prior system state, then the data in the transient region 114 is reused.

The metadata 108 can include structured metadata or unstructured metadata. Structured metadata refers to metadata that has a specific format or schema, while unstructured metadata refers to metadata without a specific format or schema. The non-volatile regions information 112 can include memory address values that specify the starting locations of each of the different multiple regions (including the transient region 114 and the persistent region 116, as well as other regions) in the non-volatile memory 104. In other examples, the non-volatile memory regions information 112 can include information that point to the logical division of the non-volatile memory regions, and also describes different attributes of each region.

In some examples, the metadata 108 can also define one or multiple secure regions in the non-volatile memory 104 that store information that can be used to perform secure operations of the SoC device 100. The secure region(s) is (are) regions of the non-volatile memory 104 accessible by predefined or specified entities of the SoC device 100, such that unauthorized entities (e.g. malware code, etc.) would not be able to access such secure region(s).

As noted above, in some examples, the transient region 114 can store information that is stored in volatile main memory in traditional systems. In such examples, by providing the transient region 114 in the non-volatile memory 104 to store information of the volatile main memory, a separate volatile main memory would not have to be provided in the system that includes the SoC device 100.

The information that is stored in the persistent region 116 can include the following, as examples: a bootloader (machine-executable instructions that are used to load other code, such as further boot code or an operating system, bare-metal code, or hypervisor), Basic Input/Output System (BIOS) code or Unified Extensible Firmware Interface (UEFI) code (BIOS code or UEFI code include machine-executable instructions that are used to perform initialization of a system), an operating system, a bare-metal code, a file system, storage volumes, and so forth.

An operating system can include a kernel which manages access by code of hardware resources, file access management, process management, and so forth. The operating system can also include additional code, in addition to the kernel, which can perform specified tasks (examples of such additional code can include a user interface application, libraries, etc.).

A hypervisor is executed in a system to perform virtualization of the hardware resources of the system. Using the hypervisor, multiple virtual machines can be implemented in the system, where each virtual machine includes a respective operating system and applications. Access of the hardware resources by the virtual machines are performed through the hypervisor.

A file system includes information that describes files and directories stored in a system including the SoC device 100.

In some examples, the persistent region 116 can be used to store information that may be stored in secondary storage of traditional systems, where the secondary storage can include solid state drives (which can be implemented with flash memory devices) and/or disk-based storage devices.

By employing the on-chip non-volatile memory 104 in the SoC device 100, certain memory and/or storage devices that are external of the SoC device 100 can be omitted, such as a volatile main memory, flash memory, and/or secondary storage. By omitting such external memory and/or storage devices, the cost associated with a system that includes the SoC device 100 can be reduced due to the reduction of the number of components in the system.

FIG. 1B shows a SoC device 100 according to further implementations. The SoC device 100 of FIG. 1B is arranged similarly as the SoC device 100 of FIG. 1A, except that the non-volatile memory 104 of the SoC device 100 of FIG. 1B further includes a read-only memory (ROM) region 120, in addition to the transient region 114 and the persistent region 116. The ROM region 120 can be used to store certain information, such as a first stage boot loader 122. In other examples, the ROM region 120 can also be used to store certain management information for the SoC device 100.

The first stage bootloader 122 is the first boot code executed when a system including the SoC device 100 is started. The first stage bootloader 122 is used to start a second stage bootloader 124, which performs additional functions associated with starting the system (resuming the system or booting the system). The second stage bootloader 124 can be used to invoke further boot code such as BIOS or UEFI code. The second stage bootloader 124 can also load an operating system or a bare-metal code. More generally, the first stage bootloader 122 is an example of a first portion of boot code, and the second stage bootloader 124 is an example of a second portion of boot code.

In the example of FIG. 1B, the second stage bootloader 124 and other code 126 (e.g. BIOS or UEFI code, the operating system, bare-metal code, etc.) are stored in the persistent region 116 of the SoC device 100. In other examples, the second stage bootloader 124 and/or BIOS or UEFI code can be stored in the ROM region 120.

It is noted that the content of the ROM region 120 can be updated, such as to update the first stage bootloader 122, the second stage bootloader 124, or BIOS or UEFI code that is stored in the ROM region 120. The update of the content of the ROM region 120 is performed by a trusted process executing on the SoC device 100.

Figure 2:
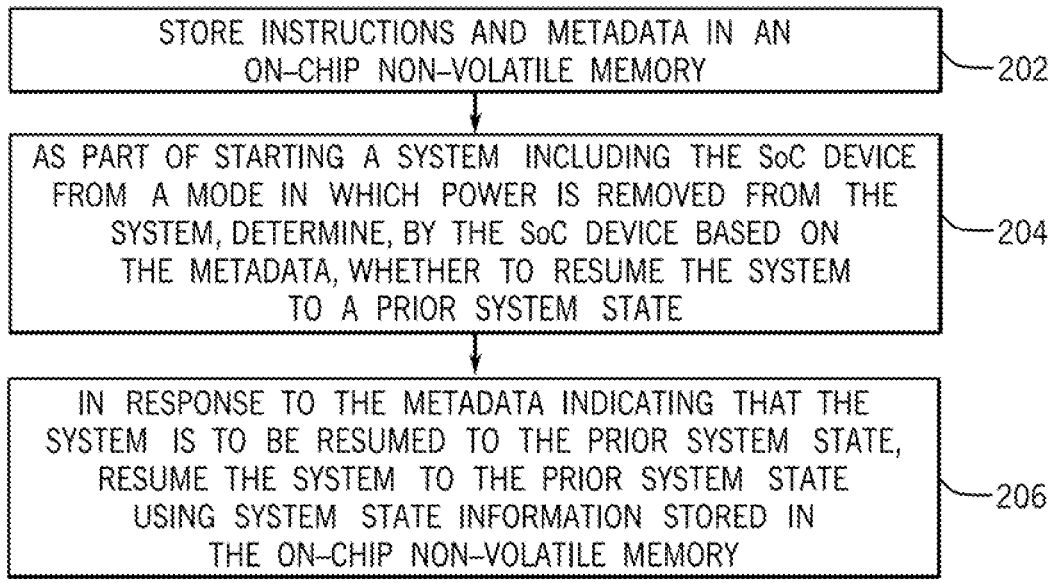
FIG. 2 is a flow diagram of an example process of resuming a system including a SoC device according to some implementations.

FIG. 2 is a flow diagram of a process that can be performed by the SoC device 100 according to some implementations. The SoC device 100 stores (at 202) machine-executable instructions and metadata in the on-chip non-volatile memory 104. As part of starting a system including the SoC device 100 from a mode in which power is removed from the system, the SoC device 100 determines (at 204), based on the metadata 108 (more specifically based on the indicator 110) whether to resume the system to a prior system state.

In response to the metadata 108 (more specifically the indicator 110) indicating that the system is to be resumed to a prior system state, the system is resumed (at 206) to the prior system state using the system state information (including the SoC state information 106 and certain data in the transient region 114) stored in the on-chip non-volatile memory 104.

FIG. 3A shows an example of a system 300A that includes the SoC device 100 and an external non-volatile memory 302 (which is external of the SoC device 100). Examples of systems can include any or some combination of the following: desktop computers, notebook computers, tablet computers, server computers, smart phones, personal digital assistants, mobile phones, communication devices, storage servers, game appliances, smart sensors, wearable devices, Internet of Things (IoT) devices, home controllers, system controllers, micro-controllers, appliances, and so forth.

The external non-volatile memory 302 can store metadata 304, and can include a transient region 306 and a persistent region 308, which are arranged to store similar content as the respective transient region 114 and persistent region 116 in the on-chip non-volatile memory 104. The presence of the external non-volatile memory 302 adds to the capacity available in the on-chip non-volatile memory 104. The metadata 304 can include information relating to the regions 306 and 308 of the external non-volatile memory 302.

In addition to the SoC device 100 and the external non-volatile memory 302, the system 300A can also include other components, including peripheral or I/O devices 310 (e.g. network interface controller, video card controller, display device, etc.).

FIG. 3B shows another example system 300B that includes a volatile main memory 320 in addition to the SoC device 100, the external non-volatile memory 302, and the peripheral devices 310 of FIG. 3A. The volatile main memory 320 is external of the SoC device 100 and can be implemented using a dynamic random access memory (DRAM), a static random access memory (SRAM), or any other type of volatile memory. In examples where the volatile main memory 320 is present, the transient region 114 and/or 306 of the respective on-chip non-volatile memory 104 and external non-volatile memory 302 would not have to store information that is stored in the volatile main memory 320.

Figure 4A:
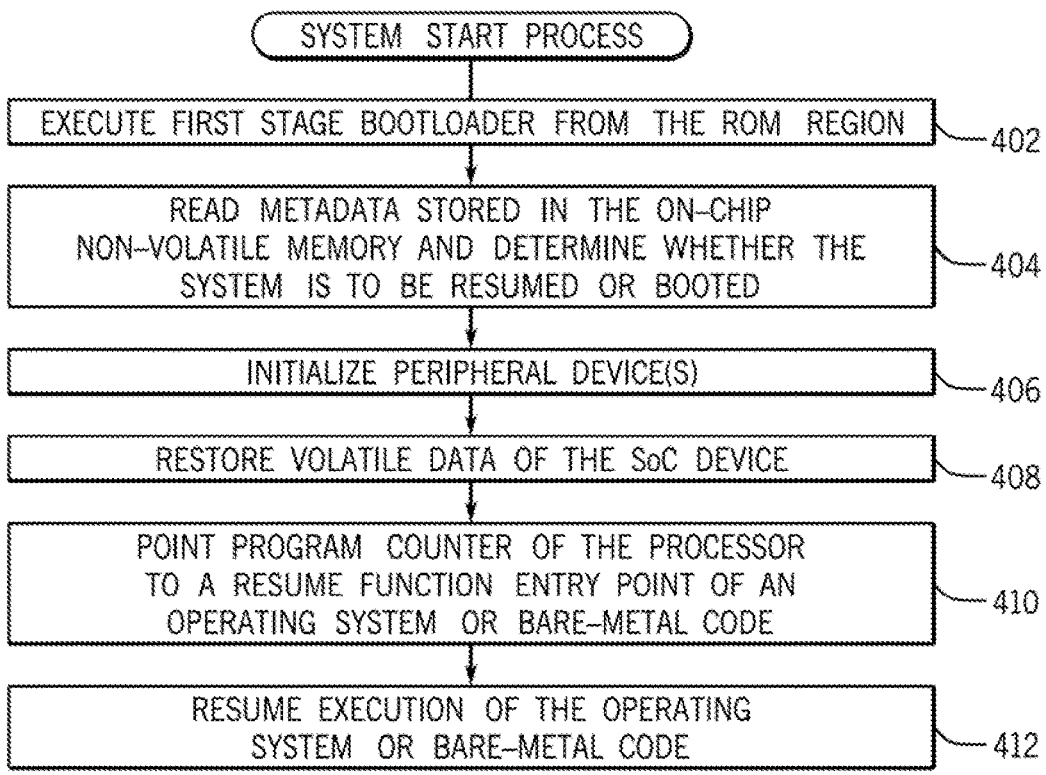
FIGS. 4A and 4B are flow diagrams of example processes performed in the systems of FIGS. 3A and 3B, respectively, according to some implementations.

FIG. 4A is a flow diagram of a process of starting the system 300A of FIG. 3A, in accordance with some implementations. As part of starting the system 300A from a mode in which power is removed from the system 300A, the processor 102 of the SoC device 100 executes (at 402) the first stage bootloader 122 from the ROM region 120 in the on-chip non-volatile memory 104. Without having to access or initialize any peripheral devices outside the SoC device 100, the processor 102 can read (at 404) the metadata 108 (and more specifically the indicator 110) stored in the on-chip non-volatile memory 104, and determine whether the system 300A is to be resumed or booted.

The following assumes that the indicator 110 specifies that the system 300A is to be resumed to a prior system state.

The first stage bootloader 122 (or other code invoked by the first stage bootloader 122) can initialize (at 406) specified one or multiple peripheral devices (e.g. graphics controller, network interface controller, etc.). Initializing a peripheral device can refer to programming the peripheral device (such as control registers in the peripheral device) with specified information to place the peripheral device in an initial state. Initializing the graphics controller, for example, can allow information associated with the starting of the system 300A to be displayed in a display device. In other examples, the initialization (at 406) of the peripheral device(s) can be performed later.

The first stage bootloader 122 (or other code invoked by the first stage bootloader 122) restores (at 408) volatile data of the SoC device 100 from the SoC state information 106 (FIG. 1A or 1B). The volatile data can include data in registers, caches, and/or other storage elements in the processor 102 and/or SoC device 100. The content of such registers, caches, and/or other storage elements is lost when power is removed. The SoC volatile data can be restored from a previous snapshot (including the SoC state information 106) stored in the on-chip non-volatile memory 104. A snapshot can refer to a copy of data taken at a particular point in time.

A program counter of the processor 102 is pointed (at 410) to a resume function entry point of an operating system or bare-metal code, based on the SoC state information 106. This entry point is a memory address that may be in the on-chip non-volatile memory 104 or in the external non-volatile memory 302 depicted in FIG. 3A. The entry point specifies the starting point of the resume function, which causes execution of the operating system or bare-metal code from a previous execution point (prior to the system 300A entering a mode in which power is removed).

The system 300A checks for presence of a memory device (or memory devices) that implement(s) the external non-volatile memory 302, and performs initialization of such memory device(s) before the program counter points to an entry in the external non-volatile memory 302. The initialization of the external non-volatile memory 302 allows access of the content of the external non-volatile memory 302.

The operating system or bare-metal code can then resume execution (at 412). Note that the operating system or bare-metal code may not be aware that it is being resumed.

The following describes operations for taking a snapshot of volatile data of the SoC device 100. Execution of machine-executable instructions of the SoC device 100 (or of the system that includes the SoC device 100) is suspended, and the content of volatile storage (such as the content of registers, caches, and other storage elements) are flushed to corresponding storage locations in the on-chip non-volatile memory 104 or the external non-volatile memory 302. Snapshots can be taken at various times, such as after a successful boot, before a graceful device power-off or turn-off, periodically, and so forth. Different snapshots can include different states to be resumed. A snapshot can also include data of the transient region 114 discussed above.

In some examples, tasks 402, 404, 408, and 410 can be executed with code and data that is entirely within the SoC device 100. During execution of these tasks, peripheral devices may not be initialized (assuming task 406 is not performed until after task 410). As a result, should an error occur during performance of tasks 402, 404, 408, and 410, a user may not be made aware of the error, and the user may not be able to use a peripheral device to reset the system. Accordingly, to allow for user access of the system 300A during tasks 402, 404, 408, and 410, a hardware reset mechanism 312 can be provided with the SoC device 100 to allow the user to reset the system. For example, a jumper, switch, button, or any other user-activatable hardware control element to provide a signal can be provided, where this user-activatable hardware control element can be activated by a user to reset the SoC device 100 in case of an error. Resetting the SoC device 100 can cause a boot of a system including the SoC device 100, which would cause the SoC state information 106 and the data in the transient region 114 to be ignored and/or discarded.

Figure 4B:
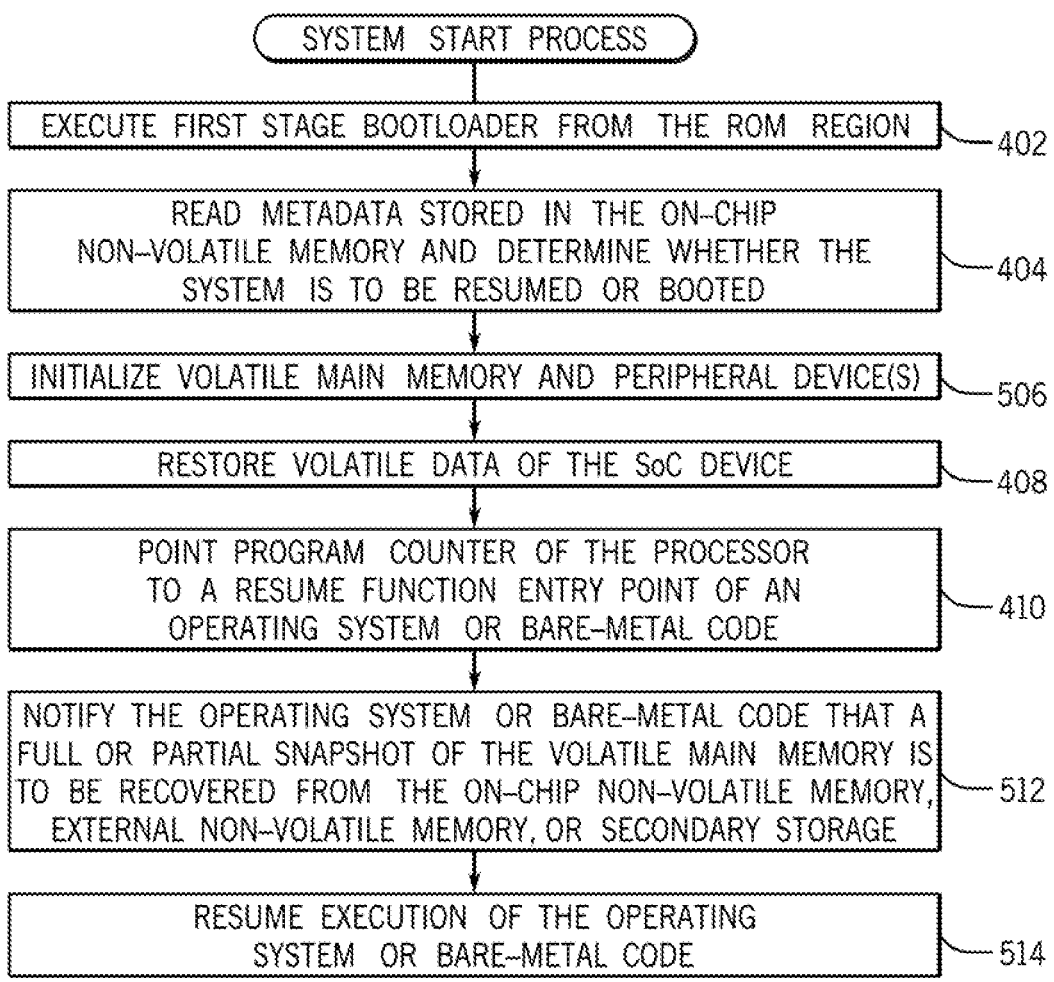

In the implementations that employ the arrangement of FIG. 3B, which includes the volatile main memory 320, the process of FIG. 4B for starting the system 300B can be performed. Tasks 402 and 404 in FIG. 4B are the same as corresponding tasks 402 and 404 in FIG. 4A.

Since the volatile main memory 320 is present, the process of FIG. 4B initializes (at 506) the volatile main memory 320, and possibly one or multiple specified peripheral devices. In other examples, initialization of the one or multiple specified peripheral devices can be performed later.

Tasks 408 and 410 in FIG. 4B are the same as corresponding tasks 408 and 410 in FIG. 4A.

Next, the operating system or bare-metal code is notified (at 512) that the operating system or bare-metal code should recover a full or partial snapshot of the content of the volatile main memory 320 from the persistent region 116 of the on-chip non-volatile memory 104, the persistent region 308 of the external non-volatile memory 302, or the secondary storage of the system 300B. The metadata 108 or 304 can be used by the operating system or the bare-metal code to locate where the snapshot of the volatile main memory 320 is located in the on-chip non-volatile memory 104, the external non-volatile memory 320, or the secondary storage.

Next, the operating system or bare-metal code can resume execution (at 514), where resuming execution can also include recovering the content of the volatile main memory 320 using the snapshot in the on-chip non-volatile memory 104, the external non-volatile memory 320, or the secondary storage.

A full snapshot of the content of the volatile main memory 320 refers to copying all data used by machine-executable instructions from the volatile main memory 320 to the on-chip non-volatile memory 104, the external non-volatile memory 320, or the secondary storage.

A partial snapshot of the content of the volatile main memory 320 refers to copying a selected subset of the data in the volatile main memory 320 (such as data used by the operating system kernel or certain other data) from the volatile main memory 320 to the on-chip non-volatile memory 104, the external non-volatile memory 320, or the secondary storage. Recovering from a partial snapshot can be quicker than recovering from a full snapshot since a smaller amount of data has to be copied to the volatile main memory 320 during system resume.

In some implementations, the metadata 108 and 304 in the respective on-chip non-volatile memory 104 and external non-volatile memory 302 are write protected to prevent unauthorized modification of the metadata. Enforcement of the write protection can be performed based on a specified policy using hardware, such as a processor, a memory controller, or other hardware component. Modification of the metadata is not allowed unless a condition of the specified policy is satisfied.

In some implementations, one or multiple regions (e.g. region storing metadata, persistent region, etc.) of the non-volatile memory 104 or 302 can be encrypted using keys. Also, trusted management mechanisms can be used for maintaining or updating metadata, content of the ROM region 120, and performing encryption and decryption using keys.

In some implementations, the SoC device 100 can include an electrical fuse (eFuse) memory, which is a one-time programmable memory that can only be programmed once. As an example, the eFuse memory can be used to store information specifying attributes of the on-chip non-volatile memory 104. Examples of such attributes can include a read-only attribute (to specify whether a region is read-only) or other attributes. Values stored in the eFuse memory can allow or block the access by the processor 102 to certain regions of the on-chip non-volatile memory 104 or external non-volatile memory 302. As an example, the information in the eFuse memory can allow a write to an example region A of the non-volatile memory. After the write to region A of the non-volatile memory, a one-time write is performed to change the eFuse memory to prevent any further writes of region A of the non-volatile memory.

In some implementations, to resume the SoC device 100 or the system that includes the SoC device 100, the execution of certain tasks (such as tasks 402 and 404 in FIG. 4A or 4B) can be omitted. Thus, the resume can start from task 408 in each of FIG. 4A or 4B.

In implementations that include multiple processors in the SoC device 100, a selected one of the multiple processors in the SoC device 100 can be used to perform the resume tasks. This can be performed for security reasons. For example, certain processors in the SoC device 100 may be used for specific tasks as a hardware guarantee for a safe boot.

Although the various examples discussed above depict one transient region and one persistent region in the on-chip non-volatile memory 104, it is noted that the on-chip non-volatile memory 104 can include multiple transient regions and multiple persistent regions for respective different operating systems.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
    writing, to an on-chip non-volatile memory of a system-on-a-chip (SoC) device, instructions and metadata when a system comprising the SoC device is powered;
    as part of starting the system from a mode in which power is removed from the system, determining, by the SoC device based on the metadata, whether to resume the system to a prior system state; and
    in response to the metadata indicating that the system is to be resumed to the prior system state, resuming the system to the prior system state using system state information stored in the on-chip non-volatile memory.

2. The method of claim 1, wherein the on-chip non-volatile memory includes a plurality of logical regions comprising a persistent region and at least one of a read-only memory region or a transient region, the method further comprising:
    accessing the metadata to locate the plurality of logical regions.

3. The method of claim 2, wherein the plurality of logical regions further comprise a secure region, the method further comprising:
    performing a secure operation by the SoC device using information in the secure region.

4. The method of claim 2, further comprising, as part of the starting:
    executing, by the SoC device, a first bootloader from the read-only memory region; and executing, by the SoC device, a second bootloader from the persistent region of the on-chip non-volatile memory, the second bootloader invoked by the first bootloader.

5. The method of claim 4, further comprising:
executing, by the SoC device, boot code and an operating system from the persistent region of the on-chip non-volatile memory.

6. The method of claim 1, further comprising:
in response to the metadata indicating that the system is to resume from a clean boot state, a last known good state, or a state corresponding to a restore point, resuming the system to the clean boot state, the last known good state, or the state corresponding to a restore point, without removing power from the system.

7. The method of claim 1, further comprising:
restoring, by the SoC device, volatile data from a snapshot in the on-chip non-volatile memory, the snapshot including the system state information.

8. The method of claim 7, further comprising:
creating the snapshot by:
suspending execution of machine-executable instructions;
flushing content of volatile storage on the SoC device to the on-chip non-volatile memory; and
storing information relating to hardware devices and machine-executable instructions in the on-chip non-volatile memory.

9. The method of claim 1, wherein the SoC device includes a user-activatable hardware control element, the method further comprising resetting the SoC device in response to activation of the hardware control element.

10. The method of claim 1, wherein the prior system state comprises information of machine-readable instructions executing in the SoC device when the SoC device is powered.

11. A system-on-a-chip (SoC) device, comprising:
a processor; and
a non-volatile memory to store metadata comprising an indicator to indicate whether a system comprising the SoC device is to be resumed or booted, and information pertaining to a plurality of regions of the non-volatile memory, the plurality of regions comprising a transient region and a persistent region, wherein the SoC device is to write the metadata to the non-volatile memory when the SoC device is powered,
as part of starting the system from a mode in which power is removed from the SoC device, the processor to:
determine, based on the indicator, whether to resume the system from a prior system state;
in response to the indicator specifying that the system is to be resumed from the prior system state, resume the system to the prior system state using system state information stored in the on-chip non-volatile memory; and
identifying the transient region and the persistent region of the non-volatile memory using the information pertaining to the plurality of regions.

12. The SoC device of claim 11, wherein the non-volatile memory further comprises a read-only memory (ROM) region to store boot code executable by the processor in response to the starting of the system.

13. The SoC device of claim 11, wherein the processor is to discard data in the transient region in response to a boot of the system.

14. The SoC device of claim 11, wherein the processor is to notify an operating system or a bare-metal code that content of a volatile main memory is to be restored from a snapshot in the non-volatile memory or another storage.

15. The SoC device of claim 11, wherein the plurality of regions further comprise a read-only memory region, wherein the processor is to, as part of the starting:
execute a first bootloader from the read-only memory region; and
execute a second bootloader from the persistent region, the second bootloader invoked by the first bootloader.

16. The SoC device of claim 11, wherein the processor is to:
create the system state information by:
suspending execution of machine-executable instructions;
flushing content of volatile storage on the SoC device to the non-volatile memory; and
storing information relating to hardware devices and machine-executable instructions in the non-volatile memory.

17. The SoC device of claim 11, wherein the prior system state comprises a state of machine-readable instructions executing in the SoC device when the SoC device is powered.

18. A system comprising:
peripheral devices; and
a system-on-a-chip (SoC) device comprising:
a processor; and
a non-volatile memory to store metadata comprising an indicator to indicate whether the system is to be resumed or booted, and information pertaining to a plurality of regions of the non-volatile memory, the plurality of regions including a transient region, wherein the SoC device is to write the metadata to the non-volatile memory when the system is powered,
as part of starting the system from a mode in which power is removed from the system, the processor to:
determine, based on the indicator, whether to resume the system from a prior system state;
in response to the indicator specifying that the system is to be resumed from the prior system state, resume the system to the prior system state using system state information stored in the on-chip non-volatile memory; and
initialize the peripheral devices using the system state information.

19. The system of claim 18, further comprising a volatile main memory, the processor to further notify an operating system or bare-metal code to recover content of the volatile main memory from a snapshot stored in the non-volatile memory or another storage.

20. The system of claim 18, wherein the prior system state comprises a state of machine-readable instructions executing in the SoC device when the SoC device is powered.

* * * * *